May 21, 1946.  F. H. ALCOTT  2,400,864
TIMBER RING CONNECTOR
Filed May 24, 1944
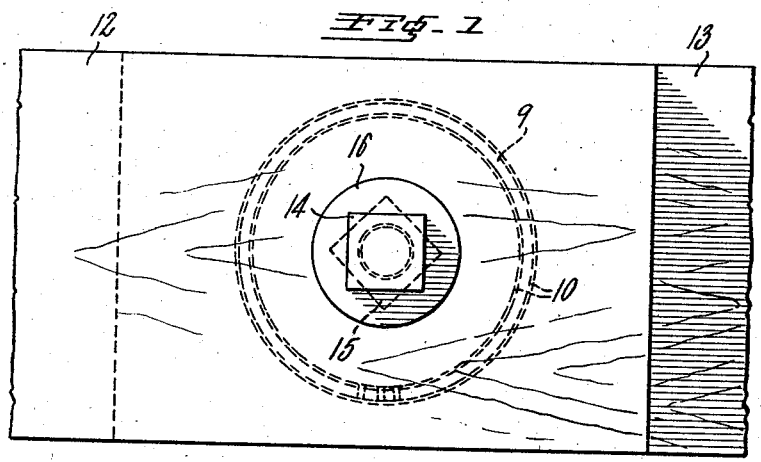
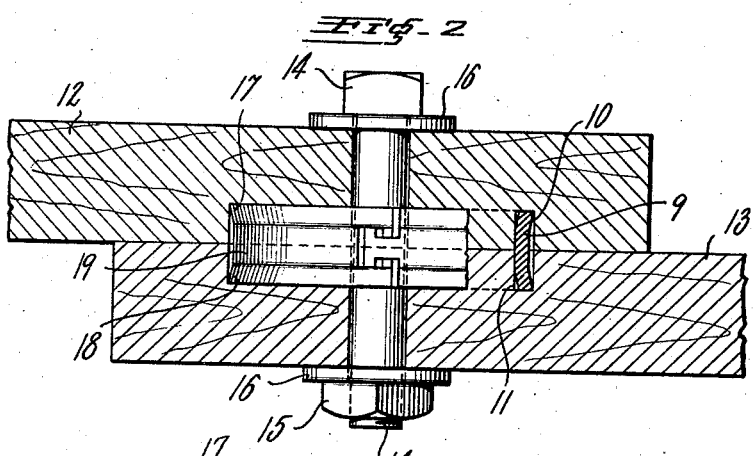
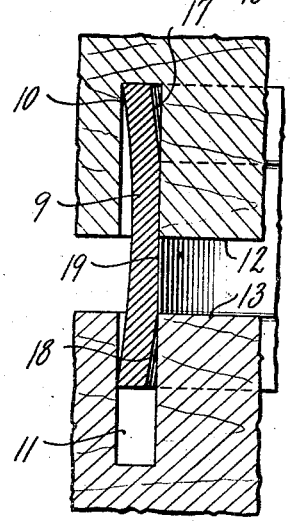
INVENTOR.
FRANK H. ALCOTT
BY
ATTORNEY Patented May 21, 1946

2,400,864

UNITED STATES PATENT OFFICE 2,400,864

TIMBER RING CONNECTOR

Frank H. Alcott, Jamaica, N. Y., assignor to Palisade Structures, Inc., New York, N. Y., a corporation of New York Application May 24, 1944, Serial No. 537,066

4 Claims. (Cl. 20—92)

The invention relates to metal connectors for timber bonding and more particularly to connectors of this character that are of the split band or discontinuous ring type.

Split ring connectors are well known in the art. They are generally circular open rings of metal and sometimes have a tongue and slot arrangement slidably engaging the ends of the split ring. Such devices are employed in the contact faces of lapped timber members to transfer a load from one member to the other. A circular groove is cut into each of the contact faces of the lapped members, the two grooves registering in such manner that half of the ring is installed in each contact face. The circular grooves are preferably cut so that the core embraced within the inside circumference of the groove is of slightly larger diameter than the inside diameter of the ring and when the ring is driven into the groove it expands accordingly. The expansion is, however, mechanically unrestrained and the ring, even when fitted with tongue and groove, may open either under the stresses exerted in originally installing the ring or, later, under the stresses encountered during use.

A split ring connector of the type just described cannot be relied on with certainty for safe transmission of forces of great magnitude. Due to this lack of restraint on the expansion of the ring, the load tends to increase the diameter of the ring elliptically and thus to exert a crushing effect upon the wooden core within the ring. The expanding force upon the ring under load furthermore tends to cause distortion and consequently exerts an upsetting or tipping action at the ring joint thereby causing dangerous stresses in the bolt. These disadvantages, singly or in combination, result in "initial set" or slip and produce deformations under load which may be cumulative, which are variable, and which are not necessarily proportionate to the loads imposed.

Accordingly, it is the object of the present invention to provide a connector which will reduce or avoid entirely these disadvantages. It is a further object of the invention to reduce the cost of timber connected framing by the use of more efficient bonds which will warrant the use of higher working stresses with safety.

It is a further object of the invention to provide such connectors as will effect a tighter registry of the ring connector with the receiving grooves in the corresponding meeting faces of juxtaposed timbers when they are drawn together.

It is a further object to provide an annular metal connector having a profile in cross section in which the interior circumference is of smaller diameter about the median line than it is at the rims above and below the median lines. The interior surface of the ring is, in fact, flared out at the rims.

In my copending application Serial No. 537,067 filed contemporaneously herewith, I have disclosed and claimed a timber connector that is provided with a lock joint in the ends. This lock joint is of such a type that the ring is permitted to expand to a certain predetermined distance and is prevented from expanding to a degree beyond this predetermined distance. The lock joint is slidable and comprises a tongue preferably T-shaped in one end of the ring fitting into a T-shaped slot in the other end of the ring. A predetermined clearance is provided between the arms of the T-shaped tongue and the shoulders of the slot. Accordingly, the ring may expand until the arms of the tongue engage the shoulders of the slot. At this point, expansion is checked.

The connector of the present invention may with advantage be provided with a lock joint of the type described in my said copending application, although it has special advantages in plain split rings or rings with ordinary tongue and slot non-locking joints.

Due to the internal profile of the ring of the present invention, it is more easily driven into the grooves in the lapped plank. This is facilitated by the flared rims which easily enter the grooves above and below and then when the ring is driven home the smaller diameter at the median line tightly grips the core walls of both joined planks at the region of maximum stress, viz., at either side of the plane of junction of the faces of the timbers.

The invention will be more clearly understood from the drawing in which Fig. 1 is a plan view of a bonded pair of juxtaposed planks employing a ring of the invention; Fig. 2 is a view through the structure of Fig. 1 with the ring connector shown partly in full line and partly in section; Fig. 3 is an enlarged (and exaggerated for clarity) cross-section of the ring illustrated in Fig. 2 showing the profile of the ring.

In Figs. 1 and 2 the numeral 9 indicates a ring connector of the invention tensely embraced within annular grooves 10 and 11 of rectangular cross-section which have been previously tooled in registry with each other into the meeting faces of planks 12 and 13. These grooves are dapped to equal depths in their respective planks so that each groove will accommodate one-half of the ring 9. The planks 12 and 13 are further bonded together by the aligning bolt 14, the nut 15 and the heavy washers 16. The grooves 10 and 11 are of slightly larger diameter than the ring 9 so that the cores inside the grooves are larger than the inside median diameter of the ring 9 when the latter is not under tension.

It will be noted that the ring 9 is a true severed band presenting a cylindrical surface at the inside median portion 19 thereof at either side of the plane of junction of the faces of the timbers. At the rims 17 and 18 above and below this median portion, the ring 9 flares out away from the cores. This formation ensures that the core walls will be in contact only with the median portion 19 of the ring and not with the rims 17 and 18 thereof until increasing stress in the planks 12 and 13 has embedded the rim edges 17 and 18 into the fibers at the bases of the grooves 10 and 11.

The ring 9 as shown in Fig. 3 is the preferred form of the ring and represents the median inside portion 19 as a flat cylindrical surface with the inside surfaces above and below this median portion flared outwardly to the rims as at 17 and 18.

In any case, however, whatever the cross-sectional form of the ring 9 may be, these possible forms all embody the same principle in that they present a closely embracing contact with the cores at the median region of maximum stress, i. e., the plane of contact between the joined planks. They are all alike in that the rims 17 and 18 tend to grip the external walls of the grooves at their bases.

While I have described the invention with reference to the joining of heavy planks and timbers, it will be readily understood that the invention is applicable to furniture, joints of all sorts as in ship building and, in fact, in any work of such nature that a dowel of any other type may be used.

Having thus described my invention, what I claim is:

1. A timber connector of the split ring type comprising a central portion at the plane of greatest stresses, the internal surface of which describes a true cylinder, and rims above and below said central portion splayed out to appreciably greater diameters than the diameter of said central portion.

2. A timber connector of the split ring type having internal and external diameters at planes adjacent its rim edges appreciably greater than the corresponding internal and external diameters at its center.

3. A timber connector of the split ring type having internal convex surfaces and outer surfaces parallel to said inner surfaces.

4. A timber connector comprising a metallic split ring having an internal surface of appreciably greater diameter at the rim edges than at the central portion and outer surfaces parallel to said inner surfaces.

FRANK H. ALCOTT.